Oct. 23, 1951  J. C. DUDDY  2,572,324
STORAGE BATTERY CONSTRUCTION
Filed Sept. 9, 1948  2 SHEETS—SHEET 1

INVENTOR
JOSEPH CHARLES DUDDY
BY
Edward J. Dwyer
ATTORNEY

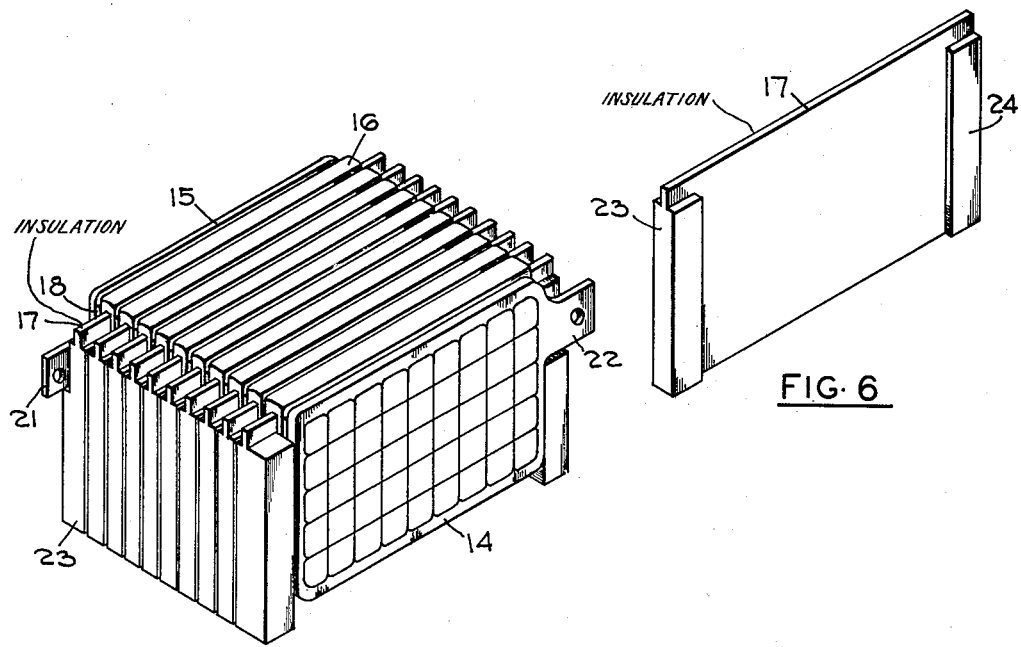
FIG. 6
FIG. 7
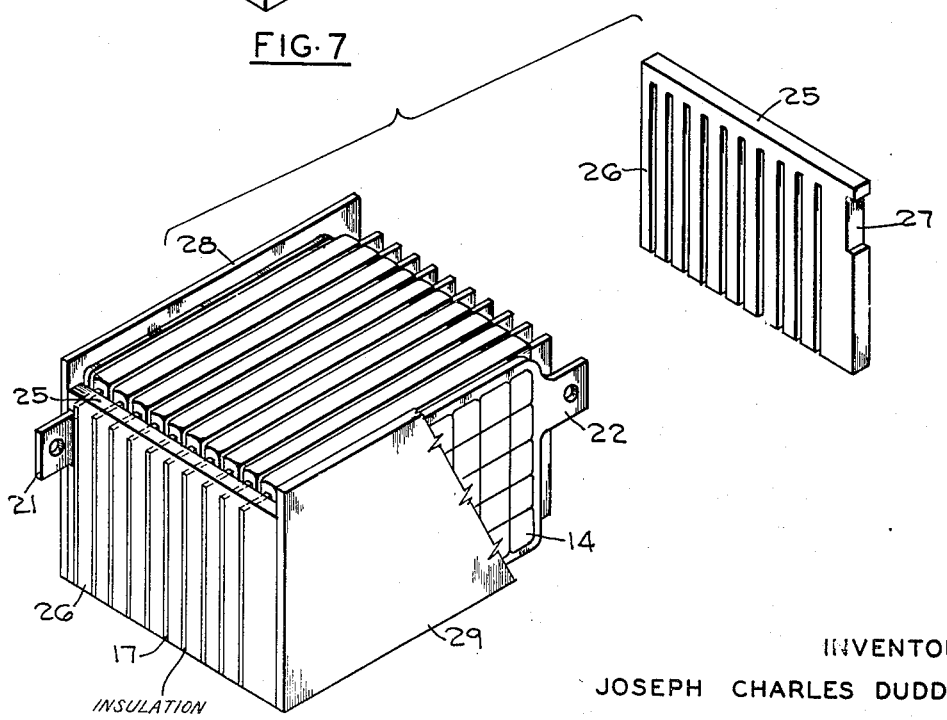
FIG. 8
INVENTOR
JOSEPH CHARLES DUDDY
BY
ATTORNEY Patented Oct. 23, 1951

2,572,324

UNITED STATES PATENT OFFICE 2,572,324

STORAGE BATTERY CONSTRUCTION

Joseph Charles Duddy, Philadelphia, Pa., assignor to The Electric Storage Battery Company, a corporation of New Jersey Application September 9, 1948, Serial No. 48,399

10 Claims. (Cl. 219—15)

This invention relates to improvements in batteries and, in particular, to an improved construction for a pile type battery from which relatively high rate discharges can be obtained for relatively low weights and volumes and in which spillage or creepage of electrolyte is avoided.

In accordance with this invention there is provided a compact battery construction capable of delivering a rate of current that is substantially higher in relation to battery size and weight than can be delivered by batteries presently known in the art. The battery is shown here to be of the lead peroxide-sponge lead-sulphuric acid type merely for purposes of illustration. It should be understood that my invention is not limited to any specific type of battery but is applicable to the construction of may different types of batteries, primary as well as secondary. This construction is characterized by a new and improved duplex element comprising relative thin positive and negative plates separated by an impervious insulating barrier. These elements are assembled as a unit which can be separately handled and packed into a compact battery construction. In accordance with this invention, means are provided by utilizing the insulating barrier to form a container for the assembled duplex units without interferring with the compact structure of the assembly. Moreover, there is provided in accordance with this invention, an improved separator which absorbs sufficient electrolyte to permit discharge of the assembled duplex units at high rates and permits free gassing of the unit.

Other features of the invention will be apparent from the description and claims that follow.

In the drawing like numerals are used to designate like parts.

Figures 6 is an isometric view of the insulating barrier having end wall forming means constructed integrally therewith.

Figure 7 is an isometric view of a battery constructed in accordance with this invention and employing the end wall forming means of Figure 6.

Fig. 8 is an isometric partially exploded view showing an alternate device for forming the end walls of the container in cooperation with the insulating barriers.

Figure 1:
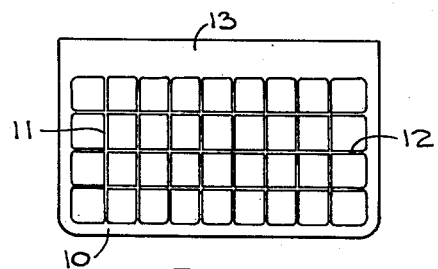
Figure 1 is a front elevational view of a grid used in the construction of the positive and negative plates forming a part of the invention.

Referring now to the drawing, 10 represents generally a grid comprising a plurality of vertical bars 11 and horizontal bars 12 and having a top bar 13 of substantially greater dimensions than the remainder of the grid. Grid 10 is adapted to be pasted or provided in any suitable manner with positive or negative active material, or material to become active, as may be desired.

Figure 2:
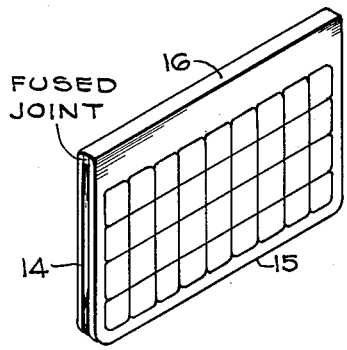
Figure 2 is an isometric view of a new and improved duplex element which forms a basic unit of this invention.

In Figure 2 is shown a duplex element composed of a grid pasted with any suitable positive active material, hereinafter designated as positive plate 14, and a grid pasted with negative active material, hereinafter designated as negative plate 15. Positive plate 14 and negative plate 15 are joined together by fusing or by welding along the upper edges thereof as at 16, top bars 13 of the respective grids being of sufficient size to provide the optimum electrical connection between said plates and thus decrease the usual drop in voltage due to internal resistance, and to provide an extensive surface for heat dissipation.

In order effectively to prevent any possible electrolytic contact between positive plate 14 and negative plate 15 constituting a duplex element, there is provided barrier 17 adapted to be inserted between said plates and extend beyond the ends thereof, thus serving to prevent intercell short circuits as might occur by reason of linking electrolyte paths from adjacent elements. Barrier 17 is, preferably, formed of "Vinylite" which is a solid, synthetic, thermoplastic resin resulting from the polymerization of compounds of the vinyl group $CH_2=CH-$. It is to be understood, however, that any other suitable material can be used, such material being (1) immune from electrolytic attack and from oxidation reactions, (2) electrically insulating, (3) non-porous, (4) non-wetting, (5) unoriented and having a high heat distortion characteristic and (6) of high mechanical strength for relative thinness.

Figure 4:
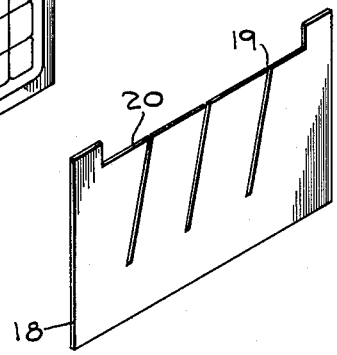
Figure 4 is an isometric view of a separator used between adjacent duplex elements.
Figure 5:
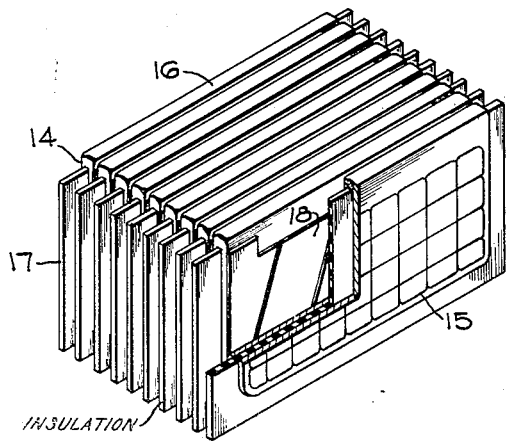
Figure 5 is an isometric view partially in cross section of an assembly of the elements shown in Figures 2, 3 and 4.

As shown in Figures 4 and 5, a separator 18 having a plurality of diagonal slots 19 and a recessed portion 20 is inserted between positive plate 14 of one duplex element and negative plate 15 of the next adjacent duplex element. separator 18 is preferably of an electrolytic resistant, absorbent material, such as matted red wood fibres held together by a permanent binder, that is adapted to receive and retain battery electrolyte. Recessed portions 20 of separators 18 provide a well to receive electrolyte and the diagonal slots 19 are a definite factor in quickening the absorption of electrolyte by the separator as well as supplying a channel for the escape of gases formed during the charge and discharge of the battery.

The assembled battery, comprising the parts described above, is formed as follows. A single negative plate 15 having a terminal lug 21 is provided with separator 18 adjacent thereto. A duplex unit composed of positive plate 14, negative plate 15 and barrier 17 is placed adjacent said separator and spaced from the next duplex unit by another separator. Any desirable number of units can be used depending on the desired output and projected uses for the battery. The cell is completed by a single positive plate 14 provided with terminal lug 22.

It will be apparent that, by this construction, there are provided a plurality of electrolytic cells each consisting of a negative plate, a separator, and a positive plate, each such cell being isolated from the adjacent cells by means of insulating barriers 17, the only contact therebetween being across the top of said barrier at 16.

To supply the necessary electrolyte, the entire unit may be dipped into said electrolyte or it may be poured over the top of the battery. It will be noted that connections 16 between the positive and negative plates are at a point higher than the remainder of the unit to permit drainage of excess electrolyte without the formation of an electrolytic path across the top of the duplex elements.

Figure 3:
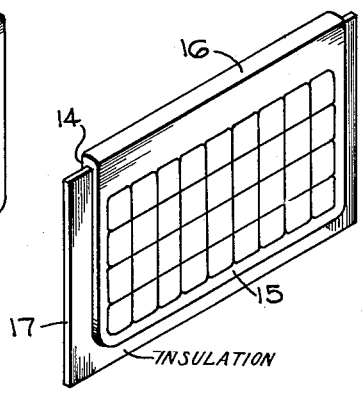
Figure 3 is a view similar to Figure 2 showing the insulating barrier inserted between the arms of the duplex element.

Figures 6, 7 and 8 show, both individually and in assembly, novel means used to form end walls of the battery container. In Figure 6 a barrier 17, similar to that shown in Figures 3 and 5, is provided with shoulders 23 and 24 adjacent the vertical edges thereof. As best shown in Figure 7 the portion of each shoulder extending to one side of the barrier is one half the combined width of the adjacent plate and separator. The shoulders of the barriers will, therefore, abut and when fastened together, as by cementing or other suitable fastening means, form a solid container wall. The container is completed by the use of wall plates 28 and 29 as shown in Figure 8. While it is preferable to form the shoulders integrally with the barrier as by injection molding, the same result could of course be reached by inserting separate strips between the ends of the barriers.

Figure 8 shows a comb comprising a back portion 25 and a plurality of teeth 26 adapted for insertion between adjacent ends of barriers 17 and to be affixed thereto to form the container wall as shown in Figure 8 in lieu of the construction shown in Figure 7. Such comb is further provided with recessed portion 27 to receive either terminal lug 21 or terminal lug 22. Also shown are wall plates 28 and 29 adjacent single negative plate 15 and single positive plate 14, respectively, and coacting with the end wall forming means to constitute a compact unitary container.

It is apparent, therefore, that by the use of the above described construction, particularly the duplex elements, impervious barriers, and absorbent separators, and by so arranging said parts as to permit the completed battery to be open to the atmosphere at the top and bottom thereof, I have achieved my object of producing a pile type battery that is capable of being discharged at high rates for relatively low weights and volumes. Furthermore, by using the special end wall forming means as shown in either Figure 6, 7 or 8 and plate shown in Figure 8, I have provided a novel compact container for the assembled duplex units.

While I have shown and described my invention in connection with a lead peroxide-sponge lead-sulphuric acid type of storage battery, it is to be understood that my invention relates to the construction of a battery, such construction producing the desired results, and is not limited to any particular type of battery. The novel construction disclosed and claimed herein is valuable as well in a lead-zinc battery, a silver-cadmium battery, a nickel-iron battery, and many other types, those few being listed merely for purposes of illustration. Therefore, I do not wish to be limited by the disclosure set forth but only by the scope of the appended claims.

I claim:

1. In a pile type battery, a plurality of closely juxtaposed U-shaped duplex elements, an impervious insulating barrier inserted between the component parts of each such element, an absorbent slotted separator interposed between each pair of adjacent duplex elements and electrolyte absorbed by said separators.

2. In a pile type battery, a plurality of alternate positive and negative plates, adjacent positive and negative plates being joined to form a plurality of U-shaped duplex elements, an impervious insulating barrier inserted between the component parts of each such element, an absorbent slotted separator interposed between each pair of adjacent duplex elements, and electrolyte absorbed by said separators.

3. In a pile type battery, a plurality of alternate positive and negative plates, adjacent positive and negative plates being autogenously joined along the upper edges thereof to form a plurality of duplex elements, a non-wettable impervious insulating barrier inserted between the component parts of each such element, and a slotted separator for receiving and retaining electrolyte interposed between each pair of adjacent duplex elements.

4. In a pile type battery, a plurality of grids, successive grids bearing positive and negative active material respectively, each grid bearing positive active material being autogenously joined to an adjacent grid bearing negative active material substantially co-extensively with the upper edges thereof whereby a plurality of duplex elements are formed, a non-wettable impervious insulating barrier inserted between component parts of each such duplex element, and a slotted separator for receiving and retaining electrolyte interposed between each pair of adjacent duplex elements.

5. A pile type battery, which comprises in combination a plurality of alternate positive and negative plates, each positive plate being autogenously joined to the next adjacent negative plate to form a duplex element, an impervious insulating barrier inserted between the component parts of each such duplex element, an absorbent slotted separator interposed between adjacent duplex elements, each separator having a recessed portion whereby a well to receive electrolyte is formed by an adjacent negative plate, an adjacent positive plate, and the walls of said recessed portion, and wall forming means associated with said barriers and coacting therewith to form the walls of a battery container.

6. A pile type battery, which comprises in combination a plurality of alternate positive and negative plates, each positive plate being autogenously joined to the next adjacent negative plate to form a duplex element, an impervious insulating barrier inserted between the component parts of each such duplex element, an absorbent slotted separator interposed between adjacent duplex elements, each separator having a recessed portion whereby a well to receive electrolyte is formed by an adjacent negative plate, an adjacent positive plate, and the walls of said recessed portion, and comb means, the teeth of which are adapted to be inserted between adjacent barriers and coact therewith to form the walls of a battery container.

7. A pile type battery, which comprises in combination a plurality of alternate positive and negative plates, each positive plate being autogenously joined to the next adjacent negative plate to form a duplex element, an absorbent slotted separator interposed between adjacent duplex elements, each separator having a recessed portion whereby a well to receive electrolyte is formed by an adjacent negative plate, an adjacent positive plate, and the walls of said recessed portion, and an impervious insulating barrier inserted between the component parts of each such duplex element, said barrier being provided on each face with a shoulder adjacent the vertical edges thereof to receive the adjacent plate and a portion of the separator adjacent said plate whereby a unit of the battery container wall is formed.

8. A pile type battery, which comprises in combination a plurality of grids, successive grids bearing positive and negative active material respectively, each grid bearing positive active material being autogenously joined to an adjacent grid bearing negative active material substantially co-extensively with the upper edges thereof whereby a plurality of duplex elements are formed, an impervious non-wettable insulating barrier inserted between the component parts of each such duplex element, an absorbent slotted separator interposed between adjacent elements, electrolyte absorbed by said separators, and wall forming means associated with said barriers and coacting therewith to form the walls of a battery container at a level lower than that at which said grids are joined.

9. In a combination in a pile type battery, a plurality of duplex elements, each such duplex element comprising a positive plate and a negative plate autogenously joined together and an impervious non-wettable insulating barrier inserted between said plates, an absorbent slotted separator between adjacent duplex elements whereby a plurality of electrolytic cells, consisting of the negative plate of one duplex element, the separator adjacent thereto, and the positive plate of the next succeeding duplex element, are formed, and electrolyte absorbed by each separator.

10. In a non-spill, pile type battery containing a plurality of alternate positive and negative plates, successive positive and negative plates being autogenously joined to form a plurality of duplex elements, and an impervious non-wettable insulating barrier between the plates of each duplex element, a slotted absorbent separator interposed between adjacent duplex elements, each separator having a recessed portion whereby a well to receive electrolyte is formed by an adjacent negative plate, an adjacent positive plate, and the walls of said recessed portion, at least two edges of each such separator being exposed to the atmosphere.

JOSEPH CHARLES DUDDY.

REFERENCES CITED

The following references are of record in the file of this patent:

UNITED STATES PATENTS

| Number | Name | Date |
| --- | --- | --- |
| 389,186 | Askew et al. | Sept. 11, 1888 |
| 1,515,738 | Hiatt et al. | Nov. 18, 1924 |
| 1,775,763 | Heise et al. | Sept. 16, 1930 |

OTHER REFERENCES

Willard: Modern Plastics, August 1943; page 62.